C. McBURNEY.
Making Rubber Fabrics.
No. 24,321.
Patented June 7, 1859.
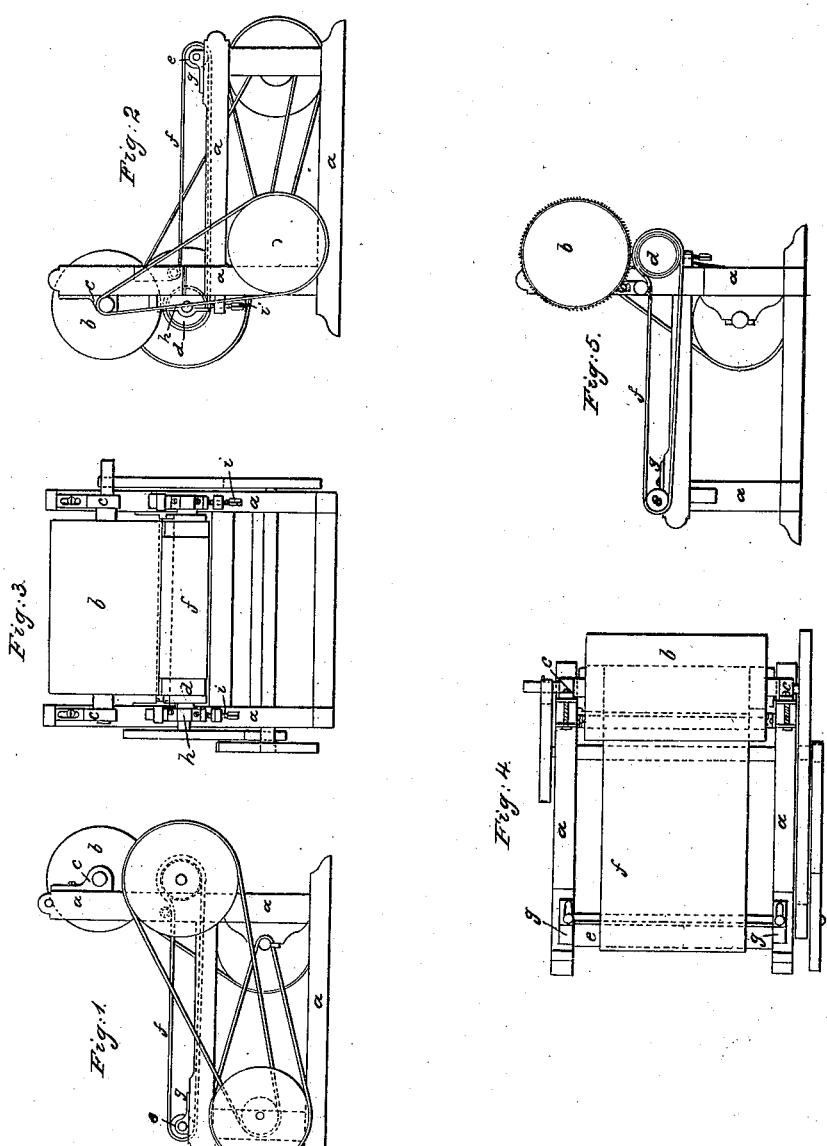
Witnesses:
Inventor:

UNITED STATES PATENT OFFICE.

CHARLES McBURNEY, OF BOSTON, MASSACHUSETTS.

MANUFACTURE OF INDIA-RUBBER BLANKETS OR APRONS USED IN THE PRINTING OF FABRICS, BOOKS, &c.

Specification of Letters Patent No. 24,321, dated June 7, 1859.

*To all whom it may concern:*

Be it known that I, CHARLES McBURNEY, of Boston, in the county of Suffolk and State of Massachusetts, have invented certain new and useful Improvements in the Manufacture of Vulcanized India-Rubber Blankets or Aprons Used in the Printing of Fabrics, Books, Newspapers, &c., and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

It has long been considered desirable to use vulcanized india rubber, as a substitute for the expensive woolen blankets and feltings, which are employed in the printing of various fabrics, books, newspapers, calicoes &c., as aprons to sustain the article to be printed. Various attempts have been made to manufacture these aprons of vulcanized rubber, which have hitherto proved unsuccessful, on account of the difficulty experienced in making them of uniform thickness throughout and in finishing them with a perfectly smooth and even surface.

By my improvements I am enabled to manufacture vulcanized india rubber blankets or aprons of a uniform thickness and with a highly finished surface, while they possess a much greater and more enduring elasticity than the woolen blankets or feltings heretofore employed. They also effect a saving in the coloring matter used in calico printing, as they do not absorb it and can also be washed without being taken from the printing machine.

The essential elements of my new machine by which I am enabled to manufacture vulcanized india rubber blankets or aprons consists of a large emery cylinder which is revolved at a rapid rate, and grinds off the inequalities of the blanket, and a small adjustable feed roll over which and a guide roll, the blanket to be finished is stretched. The india rubber blanket is fed along slowly to the emery cylinder, which revolves in the same direction that the blanket is moving until it is reduced to a uniform thickness throughout, and its surface is smoothly and evenly finished.

My machine is represented in the figures of the accompanying plate of drawings of which—

Figure 1, is a side elevation of the machine. Fig. 2, an elevation of the opposite side. Fig. 3, an end view. Fig. 4, a plan or top view and Fig. 5, a central longitudinal vertical section.

$a$, $a$, $a$, in the drawings represent the supporting frame work of the machine.

$b$, $b$, is a cylinder coated with emery or other similar substance the shaft of which has adjustable bearings $c$, $c$.

$d$, $d$, is a small feed roll around which and the guide roll $e$, $e$, the endless india rubber blanket $f$, $f$, to be finished is placed, the guide roll $e$, $e$, having adjustable bearings $g$, $g$, so that the said roll can be adapted to blankets of different lengths.

The feed roll $d$, $d$, is placed in adjustable bearings $h$, $h$, which can be moved up or down by means of the screws $i$, $i$, so as to carry the blanket nearer to or farther away from the emery cylinder as may be desirable. A quick motion is given to the emery cylinder $b$, $b$, and a slow motion in the opposite direction to the feed roll $d$, $d$, by means of bands and pulleys as clearly shown in the drawings. The india rubber blanket or apron is fed along in the same direction that the emery cylinder revolves. By the adjusting screws $i$, $i$, the blanket as it is fed along on the roll $d$, $d$, is brought in contact with the revolving emery cylinder $b$, $b$, which grinds off all inequalities as the blanket passes along until it is reduced to a perfectly uniform thickness.

The feed roll $d$, $d$, is covered with a thin coating of india rubber or other elastic substance, first ground to fit the emery cylinder, by the revolution of the said cylinder. By thus covering the feed roll with an elastic substance which is susceptible of being ground to fit the emery cylinder, an unerring adjustment of the feed roll to the said cylinder is effected, thereby securing the accurate feeding of the blanket to the emery cylinder, so that its surface will be uniformly ground.

What I claim as my invention and desire to secure by Letters Patent as an improvement in the manufacture of india rubber blankets for calico printing machines and other similar purposes is—

Bringing the blanket to a uniform thickness and smooth surface by passing it between a revolving emery roll, and a revolving feed roll so arranged with respect to each other that the surface of the feed roll shall be ground by the emery wheel as set forth for the purpose specified.

CHAS. McBURNEY.

Witnesses:
 THOS. R. ROACH,
 P. E. TESCHENMACHER.